United States Patent
Burmeister et al.

(10) Patent No.: US 7,712,958 B2
(45) Date of Patent: May 11, 2010

(54) MEASURING DEVICE, ESPECIALLY TEMPERATURE MEASURING TRANSDUCER

(75) Inventors: Dirk Burmeister, Hagenbach (DE); Eric Chemisky, Betschdorf (FR)

(73) Assignee: Siemens Aktiengesellschaft, Munich (DE)

( * ) Notice: Subject to any disclaimer, the term of this patent is extended or adjusted under 35 U.S.C. 154(b) by 996 days.

(21) Appl. No.: 10/583,223

(22) PCT Filed: Dec. 17, 2004

(86) PCT No.: PCT/EP2004/014440
§ 371 (c)(1), (2), (4) Date: Jun. 16, 2006

(87) PCT Pub. No.: WO2005/062012
PCT Pub. Date: Jul. 7, 2005

(65) Prior Publication Data
US 2008/0279255 A1 Nov. 13, 2008

(30) Foreign Application Priority Data
Dec. 19, 2003 (DE) ................................ 103 59 988

(51) Int. Cl.
*G01K 7/00* (2006.01)
*H01R 31/00* (2006.01)
(52) U.S. Cl. ........................ 374/183; 374/163; 327/512; 702/59; 702/130
(58) Field of Classification Search .................. 374/183, 374/163; 327/512; 702/59, 130
See application file for complete search history.

(56) References Cited
U.S. PATENT DOCUMENTS

| 5,317,520 A | * | 5/1994 | Castle .......................... 702/58 |
| 5,829,876 A | | 11/1998 | Schwartz et al. |
| 2002/0186435 A1 | | 12/2002 | Shpantzer et al. |

FOREIGN PATENT DOCUMENTS

| DE | 198 12 839 A1 | 9/1999 |
| EP | 0 521 234 A2 | 1/1993 |
| EP | 1 330 054 A2 | 7/2003 |
| JP | 06312395 A | 11/1994 |

OTHER PUBLICATIONS

I. Seto, T. Ohtsuki, H. Yashima, I. Sasase and S. Mori, "Polarization state and phase noise insensitive POLSKphase-diversity homodyne system in coherent optical communications", Communications 1992, ICC 92, vol. 2, pp. 743-747, Abstract.

* cited by examiner

*Primary Examiner*—Gail Verbitsky
*Assistant Examiner*—Mirellys Jagan

(57) ABSTRACT

The invention relates to a measuring device, in particular a temperature measuring transducer, comprising an electrical resistor, which alters its value based on a chemical or physical variable that is to be measured and which is connected to an evaluation device via at least three lines. Said evaluation device checks the lines for line breaks and if such a break has occurred, switches from a four-wire circuit to a three- or two-wire circuit as required, in order to permit the continuation of the measuring operation. This improves the reliability of the measuring device.

16 Claims, 1 Drawing Sheet

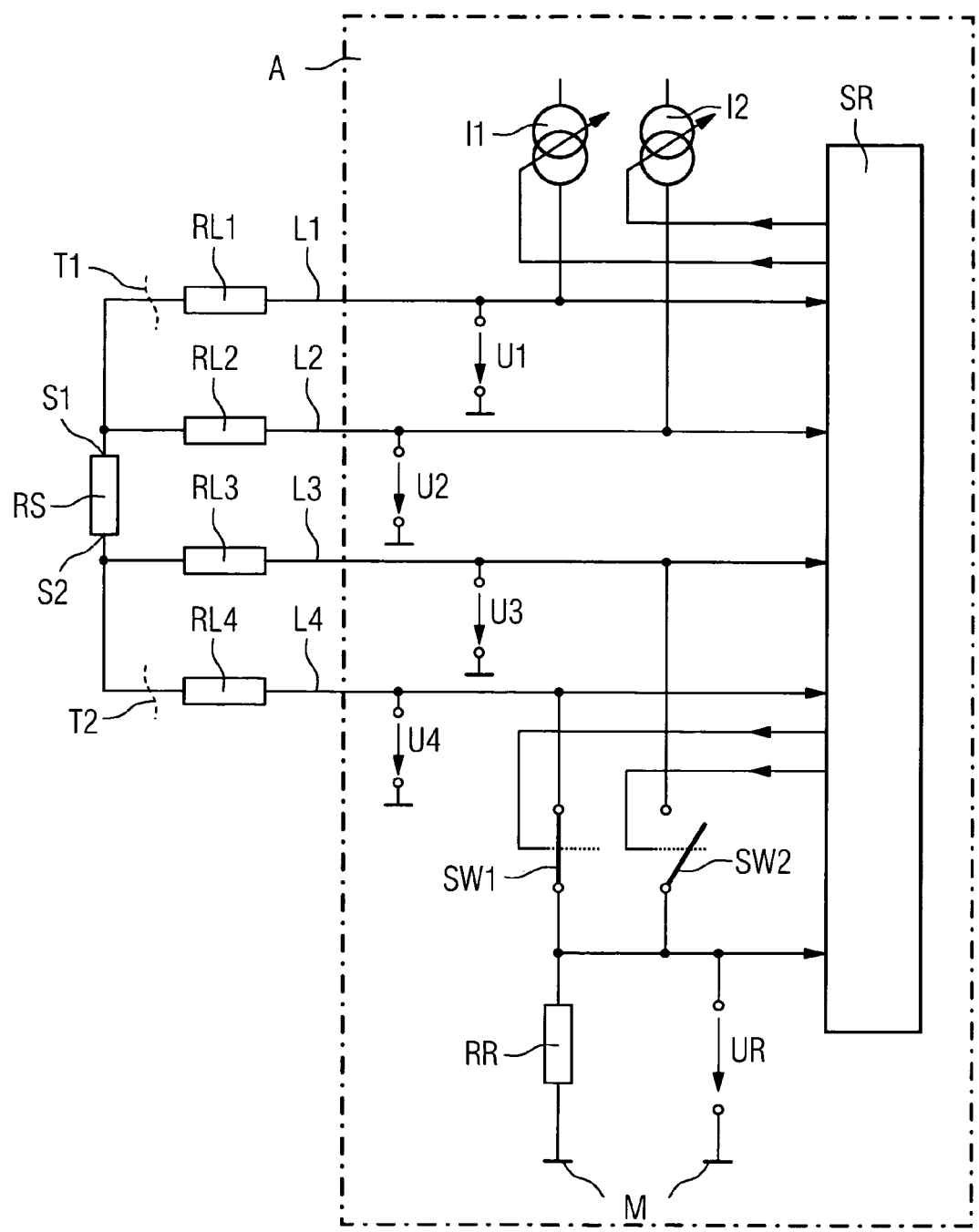

MEASURING DEVICE, ESPECIALLY TEMPERATURE MEASURING TRANSDUCER

CROSS REFERENCE TO RELATED APPLICATIONS

This application is the U.S. National Stage of International Application No. PCT/EP2004/014440, filed Dec. 17, 2004 and claims the benefit thereof. The International Application claims the benefits of German Patent application No. 103 59 988.6 filed Dec. 19, 2003. All of the applications are incorporated by reference herein in their entirety.

FIELD OF THE INVENTION

The invention relates to a measuring device, especially a temperature measuring transducer, with an electrical resistor, which alters its value depending on a chemical or physical variable.

BACKGROUND OF THE INVENTION

A temperature measuring transducer with such a measuring device is for example known from U.S. Pat. No. 5,317,520. The measurement of a temperature as a chemical or physical variable is undertaken with an electrical resistor, which alters its value depending on this variable. This resistor is connected in a three-wire or four-wire circuit to an evaluation device. Each side of the resistor has two lines for making contact between it and a four-wire circuit. Two of the lines are used to conduct a current through the electrical measuring resistor. The two other lines are used to tap off the voltage which is dropping at the measuring resistor during the measurement. This enables the value of the measuring resistor to be measured without a current flowing through the two lines via which the voltage is tapped off. This means that the measuring result is not influenced by a voltage drop at the measuring lines. In a three-wire circuit also described, three lines are used to connect the electrical measuring resistor to the evaluation device. In this case it is also possible to compensate for the influence of the line resistance on the measuring result, for example in that the voltage difference between a line, with which the voltage is tapped off at the resistor and current-carrying return line is determined and taken into account in a suitable manner in the calculation of the measuring result. The evaluation device of the known measuring transducer can test the lines for wire breaks by individually disconnecting each of the lines to the electrical resistor. A variation in the measured value can be detected in this test mode and it can thus be concluded that there has been a wire break. It is thus possible, using the known measuring transducer, to detect a break in a measuring line and to notify this error to a control center in an automation technology system. The measuring transducer switches to an error mode and not longer outputs temperature signals. Depending on the safety concept of the installation, this can have the disadvantage of triggering an immediate shutdown of the installation. After the error state has been notified to the operating personnel the defect in the line can be rectified by the maintenance personnel.

Since fault tracing in a large installation can be thoroughly time-consuming and longer shutdowns are to be avoided, measuring transducers, as known for example from the Abstract JP 2001-208617 A are configured as redundant devices to provide higher availability. With this type of redundant configuration, if there is a defect in a measuring transducer, another transducer can continue to be used for recording a process temperature, without the installation having to be taken out of operation after the defect. The disadvantage of a redundant arrangement at measuring transducers however is that it entails considerable expense since, in addition to the actual measuring transducers required for the automation of an installation, additional transducers must be disposed of which can take over the function of a failed measuring transducer where necessary.

SUMMARY OF THE INVENTION

The object of the invention is to create a measuring device, especially a temperature measuring transducer, with an electrical resistor, which varies its value depending on a chemical or physical variable, the outstanding feature of which is its higher availability and which at the same time only involves slightly higher expense than conventional measuring devices.

To achieve this object the new measurement device of the type mentioned at the start has the features specified in the characterizing part of the claims. Advantageous developments of the invention are described in the dependent claims.

The advantage of the invention is that it allows the value of the resistor to continue to be measured when a line break occurs in one of the two lines which are connected to same side of the resistor. A line break of a line with which the resistor is connected to an evaluation device thus does not necessarily result any more in a failure of the measuring device. Especially in a measuring transducer for measuring a process temperature in an automation technology installation, the process temperature can continue to be measured with sufficiently high accuracy and thereby the automated installation can remain in operation. The number of system shutdowns is thus reduced and associated high costs are saved. Since the measuring transducer continues to deliver valid measurement values despite the line break, repair work does not have to be dealt with immediately when a defect occurs but can be undertaken within the framework of scheduled maintenance work. The high costs involved with a redundant arrangement of measuring transducers can advantageously be avoided by the invention.

If the influence of the line resistance of the second line on the measuring result is compensated for this has the advantage that, even after the occurrence of the line break, highly accurate measurements are still possible. For example on failure of a line of a four-wire circuit, a switchover can be made to measurement with a three-wire circuit which still delivers high measurement accuracy.

The state of the lines by which a measuring resistor is connected to an evaluation device can be checked in a particularly simple manner if the evaluation device has a control and processing unit and at least one switchable current source, which is connected to the lines which are on the first side of the measuring resistor in such a way that the current source can optionally be switched to either of the two lines for line checking. If there is no current flow when the current source is connected to a line the conclusion can be drawn that there is a line break in the line concerned. In this manner a simple check of the two lines which normally conduct current in a four-wire circuit is possible.

To test the lines connected on the second side of the measuring resistor a controllable switchover device can be provided in the appropriate manner in the evaluation device which is able to be activated by the control and processing unit. This switchover device can be wired up to the two lines which are connected to the second side of the measuring resistor in such a way that there is the option of switching one of the two lines in each case to discharge the current fed by the current source into the measuring resistor. If no current flows through the measuring resistor in a switching state the presence of a line break can again be deduced.

When the electrical resistances of the individual lines are determined by the evaluation device during operation of the measuring device with intact lines, this has the advantage that after occurrence of a line break, the influence of the line resistance on the measuring result allows compensation to be computed by the control and processing unit. This improves the measurement accuracy.

BRIEF DESCRIPTION OF THE DRAWINGS

The invention, along with its embodiments and advantages, is explained below with reference to the drawing in which an exemplary embodiment of the invention is presented.

The FIGURE shows an example of a basic diagram of a measuring device with an electrical resistor.

DETAILED DESCRIPTION OF THE INVENTION

The FIGURE shows a basic diagram of a measuring device with an electrical resistor RS, which in a temperature measuring transducer varies its resistance values depending on a temperature. The resistor RS is connected by four lines L1, L2, L3 and L4 to an evaluation device A. The circuit in this case is what is known as a four-wire circuit, in which two lines L1 and L2 are connected to a first side S1 of the resistor RS and two lines L3 and L4 to a second side S2 of the resistor RS. The amount of electrical resistance to which the lines L1 ... L4 are subjected is taken in account by including concentrated resistances RL1, RL2, RL3 or RL4 in the circuit diagram. The evaluation device A contains a control and processing unit SR, which can essentially be implemented by a microprocessor with a program memory for a suitable operating program and with a data memory for storing variable values. Two controllable current sources I1 and I2 which are connected to the lines L1 or L2 can be controlled with this control and processing unit SR. Furthermore two switches SW1 and SW2 can be controlled by the control and processing unit, which can optionally connect the one side of reference resistor RR of which the other side is connected to ground M, with the line L3 or with the line L4. The switches SW1 and SW2 can almost be operated as changeover switches. Voltages U1, U2, U3 and U4, which at the end of the lines L1, L2, L3 or L4, which are connected to the evaluation device, act as reference potentials to ground, are routed to analog inputs of the control and processing unit SR and a converted there into digital values for further processing. The same applies to a voltage UR which is set up as a result of a current flow at reference resistor RR.

In normal operation the current of the source I1 flows via resistor RL1, line L1, line resistance RL4 of line L4, switch SW1 and reference resistor RR through the measuring resistor RS. The difference between the two voltages U2 and U3 as well as the voltage UR is measured. The following equation applies for the resistance RR:

$$RS = \frac{(U2 - U3)}{UR} \cdot RR,$$

For this measurement the current source I1 is switched on, the current source I2 switched off, the switch SW1 closed and the switch SW2 open.

While measurement operation is running there is continuous monitoring for whether a line break has occurred in the lines L1 to L4. On occurrence of a line break in one of the lines L1 or L4 no current flows in this operating mode through the reference resistor RR and the voltage UR measured by the control and processing unit amounts to 0V. This is thus detected immediately. To check the lines L2 and L3 the current source I1 is briefly switched off and the current source I2 connected in, and also switch SW1 is opened and switch SW2 closed. If in this state the voltage UR=0V, a break in the line L2 and/or L3 is detected. Depending on which of the lines L1 through L4 is broken, a choice of one of the two current sources which has to be connected in and a choice of one of the two switches which has to be closed is made so that measurement of the resistance RS is still possible.

An example is described below of how a break in the line L1, which marked in the FIGURE by a dashed dividing line T1, can be detected and handled. During normal measurement a measuring current from the source I1 is conducted via the line L1 through the resistor RS via the line L4 and the switch SW1 through the resistor RR. A line break is detected as soon as voltage UR=0V. A check should now be made as to whether the line L1 or the line L4 is defective. To this end the current source I2 is activated and the current source I1 deactivated. The current now flows via the line L2 to one side S1 of the resistor RS. Since with the dividing line T1 shown in the drawing, a voltage UR>0 now occurs, the immediate conclusion can be drawn that the line L1 is broken. Were the voltage UR to continue to be 0V, this would lead to the conclusion that line L4 is defective or that both lines L1 and L4 are defective. Depending on the error detected a suitable operating mode for further measurement of the resistor RS is selected. For the example shown in FIG. 1 with a dashed dividing line T1 with just a break in the line L1, further measurements in the manner of a three-wire circuit can be performed. This is also highlighted by high measurement accuracy. The resistance RS is determined in accordance with following equation:

$$RS = \frac{[(U2 - U4) - 2 \cdot (U3 - U4)]}{UR} \cdot RR.$$

In this equation the current source I1 is switched off, the current source I2 switched on, the switch SW1 closed and the switch SW2 open.

In a corresponding manner, for a break in the line L4 the resistance RS can be computed using the formula $$RS = \frac{[(U1 - U3) - 2 \cdot (U1 - U2)]}{UR} \cdot RR,$$

In this equation the current source I1 is now switched on, the current source I2 switched off, the switch SW1 open and the switch SW2 closed.

In a similar manner, for a break in lines L2 or L3 the value of the resistance RS can continue to be determined with a three-wire circuit. To do this it is only necessary in the two formulae given above to replace the voltage U2 by U1 or the voltage U3 by U4.

Provided the lines L1 to L4 possess the same resistance RL1, RL2, RL3 or RL4, the measuring result in the three-wire circuit is identical to the measuring result in the four-wire circuit. Thus no disadvantage as regards accuracy arises from a break in a single wire of the four lines L1 to L4 if a switchover is undertaken from a four-wire circuit to a three-wire circuit.

The circuit shown in the FIGURE with a break in line L1, which is indicated by the dividing line T1, corresponds, as already mentioned above, to a three-wire circuit. The following paragraphs described how, during operation of this circuit a test for a break in a further line can be conducted and a measurement of the resistance RS with an additional break in one of the lines L3 or L4 continues to be possible. The measurement of the resistance RS is undertaken for the three-wire circuit in accordance with the equation already mentioned above. During ongoing measurement operation continuous monitoring is undertaken as to whether the line break has occurred in the lines L2, L3 and/or L4. On occurrence of a line break current can no longer flow through the resistor RR. The voltage UR therefore becomes 0V. The lines L2 and L4 are therefore checked during normal measurement. To check the line L3, switch SW1 is opened briefly and switch SW2 is closed by the control and processing unit SR. If the voltage is now UR=0V, a line break is detected and a check is subsequently made as to which of the lines L2, L3 and/or L4 is defective. Depending on the result of the check, the current of the current source I2 is switched over via the switch SW1 or SW2 and a suitable type of measurement is selected.

It is assumed below that, in addition to line L1, line L4 is also broken, as indicated by two dashed dividing lines T1 and T2 in the FIGURE. Which of the three lines L2, L3 and L4 has a line break can for example be determined using the following procedure. With normal measurement in which the current I2 is conducted via the line L2, the resistor RS, the line L4, the switch SW1 and the resistor RR the control and processing unit SR detects the line break in the line L4 since the voltage UR=0. A check should now be made as to whether the line L2 or the line L4 is defective. To this end the setting of the switches SW1 and SW2 is changed by the control and processing unit SR so that the switch SW1 is now opened and the switch SW2 closed. If in this state the voltage UR=0V, then L2 is the broken line. If on the other hand the voltage UR>0V, it can be directly deduced that the line L4 must be defective. For the case in which line L2 is broken, no further measurements can be performed. In the case of a break in line L4, the measurement of the resistor RS can continue to be undertaken with a two-wire circuit. The resistance RS is thus computed in accordance with the following equation:

$$RS = \frac{[(U2-U3)]}{UR} \cdot RR$$

In this case the current source I1 is switched off, the current source I2 switched on, the switch SW1 open and the switch SW2 closed.

In a similar manner the measurement of the resistance RS can also continue to be undertaken if instead of the break in line L4, there is a break in line L3. In this case, in the above equation for the resistance RS it is only necessary to replace the voltage U3 by the voltage U4.

Without further measures the measuring result of the resistance measurement in a two-wire circuit is not identical to the measuring result in a three-wire or four-wire circuit. The reason for this is that with a two-wire circuit the line resistances of the lines may not be ignored. A change in the circuit from a three-wire circuit to a two-wire circuit would thus reduce the measurement accuracy. Advantageously this is avoided by the control and processing unit SR determining, at a time at which the wiring is still in order, the relevant value of the resistances RL1, RL2, RL3 and/or RL4. If the individual resistance values are available, when a line break occurs and there is a switchover to a two-wire circuit, the measuring result can be corrected on the basis of the resistance values now known. The measuring result then has approximately the same accuracy as with a three-wire or a four-wire circuit. A residual inaccuracy in the measuring result remains however as a result of the temperature dependence of the line resistances, which would have to be corrected using other measures. The measurement and computation of the individual line resistances RL1 . . . RL4 can, in the fault-free four-wire circuit shown in the drawing, be undertaken in accordance with the following equations:

$$RL1 = \frac{(U1-U2)}{UR} \cdot RR$$

with I2=off, I1=on; SW1 is closed, SW2 is open, $$RL2 = \frac{(U2-U1)}{UR} \cdot RR$$

with I2=on, I1=off; SW1 3 is open, SW2 is closed, $$RL3 = \frac{(U4-U3)}{UR} \cdot RR$$

with I2=on, I1=off; SW1 3 is open, SW2 is closed and $$RL4 = \frac{(U3-U4)}{UR} \cdot RR$$

with I2=off, I1=on; SW1 is closed, SW2 is open.

If there is a line break the evaluation electronics A is thus in a position to select another suitable type of circuit, a three-wire or two-wire circuit as required, and to continue measurement operation without any great loss of accuracy. When the measuring device is used in an intelligent measuring transducer, with a PROFIBUS or HART interface for example, the detected line break can be transmitted as status information to a control center and possibly a repair of the broken line initiated.

As an alternative to the exemplary embodiment described, in which a current source is used for feeding a measuring current into the measuring resistor, it is of course also possible to use a voltage source and to record the current value which is set in this case for defining the value of the measuring resistance.

The invention claimed is:

1. A temperature measuring transducer, comprising:
   a variable electrical resistor having variable resistance that depends on a chemical or physical variable; and
   an evaluation device connected to the variable resistor by at least three lines through which the lines can be checked for a line break, wherein, for a break in a first of two lines which are connected on the same side of the variable resistor, a measurement of the resistance value using the first line is performed with the second line by routing the current conducted through the variable resistor via the second line and by tapping off the falling voltage associated with the second line, wherein the evaluation device compensates for the influence of the resistance of the second line, and wherein the evaluation device further comprises a control and processing unit and a switchable current source wherein the current source for line checking is switchable to either the first or second line, which are connected to a first side of the variable resistor and that the current flowing through the variable resistor is recorded and evaluated to establish a line break.

2. The measuring device in accordance with claim 1, wherein the physical variable is temperature.

3. The measuring device in accordance with claim 1, wherein the evaluation device is connected to the variable resistor by four lines.

4. The measuring device in accordance with claim 1, wherein the switchable current source is set to a plurality of discrete current outputs.

5. The measuring device in accordance with claim 1, wherein tapping off the falling voltage enables the measuring result value to not be influenced by a voltage drop at the measuring lines.

6. The measuring device in accordance with claim 1, wherein the evaluation device further comprises a controllable switchover unit that checks the lines connected to the second side of the variable resistor and is switched to direct away a current from the current source into the variable resistor and the current flowing through the variable resistor is recorded and evaluated to identify a line break.

7. The measuring device in accordance with claim 6, wherein the evaluation device is configured to determine the line resistances for intact lines.

8. The measuring device in accordance with claim 7, wherein measuring transducer is suitable for temperature measurement and for use in an automation technology system.

9. A method for measuring a temperature, comprising:
applying a current to an electrical resistor having variable resistance that depends on temperature;
evaluating an associated voltage drop across the variable resistor via an evaluation device connected to the variable resistor by at least three lines through which the lines can be checked for a line break, wherein, for a break in a first of two lines which are connected on the same side of the variable resistor, a measurement of the resistance value using the first line is performed with the second line by routing the current conducted through the variable resistor via the second line and by tapping off the falling voltage associated with the second line; and
correlating the evaluated voltage drop of the variable resistor with the associated temperature to be measured,
wherein the evaluation device compensates for the influence of the resistance of the second line, and
wherein the evaluation device further comprises a control and processing unit and a switchable current source wherein the current source for line checking is switchable to either the first or second line, which are connected to a first side of the variable resistor and that the current flowing through the variable resistor is recorded and evaluated to establish a line break.

10. The method in accordance with claim 9, wherein the evaluation device is connected to the variable resistor by four lines.

11. The method in accordance with claim 9, wherein the switchable current source is set to a plurality of discrete current outputs.

12. The method in accordance with claim 9, wherein tapping off the falling voltage enables the measuring result value to not be influenced by a voltage drop at the measuring lines.

13. The method in accordance with claim 9, wherein the evaluation device further comprises a controllable switchover unit that checks the lines connected to the second side of the variable resistor and is switched to direct away a current from the current source into the variable resistor and the current flowing through the variable resistor is recorded and evaluated to identify a line break.

14. The method in accordance with claim 13, wherein the evaluation device is configured to determine the line resistances for intact lines.

15. The method in accordance with claim 14, wherein measuring transducer is suitable for temperature measurement and for use in an automation technology system.

16. The method in accordance with claim 15, wherein the physical variable is temperature.

* * * * *